Nov. 2, 1965 E. MEINECKE 3,215,166
FLANGED JOINT FOR PIPES
Filed Oct. 5, 1962 5 Sheets-Sheet 3

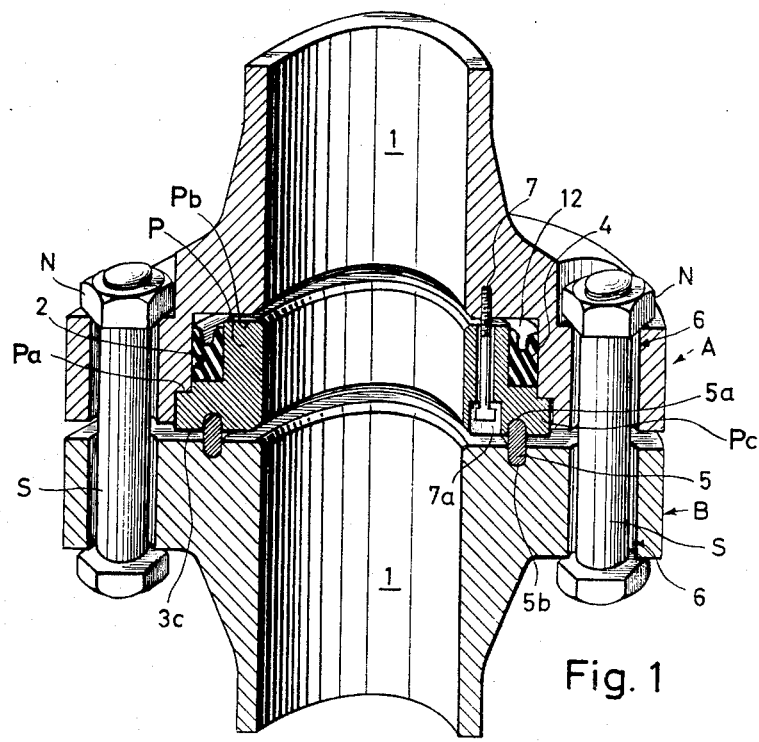

INVENTOR:
ERICH MEINECKE
BY Robert H. Jacob
AGT.

Nov. 2, 1965  E. MEINECKE  3,215,166
FLANGED JOINT FOR PIPES
Filed Oct. 5, 1962  5 Sheets-Sheet 4

INVENTOR:
ERICH MEINECKE
BY Robert H Jacob
AGT.

Nov. 2, 1965     E. MEINECKE     3,215,166
FLANGED JOINT FOR PIPES
Filed Oct. 5, 1962     5 Sheets-Sheet 5
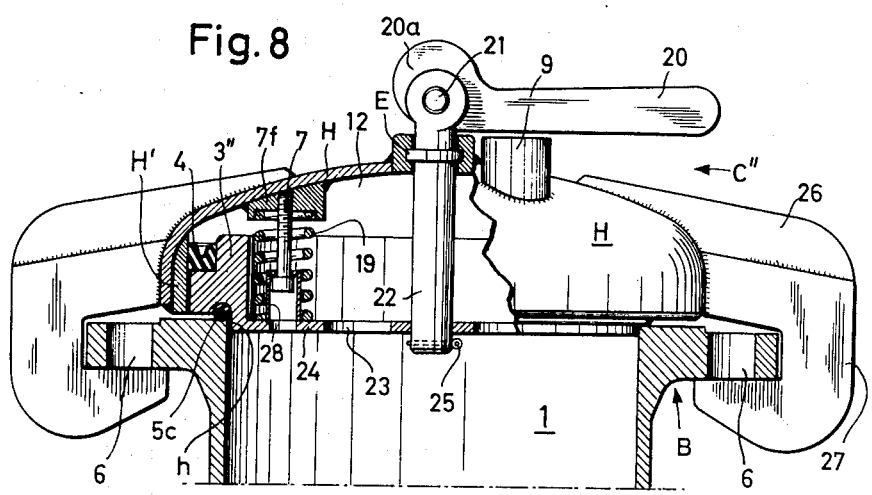
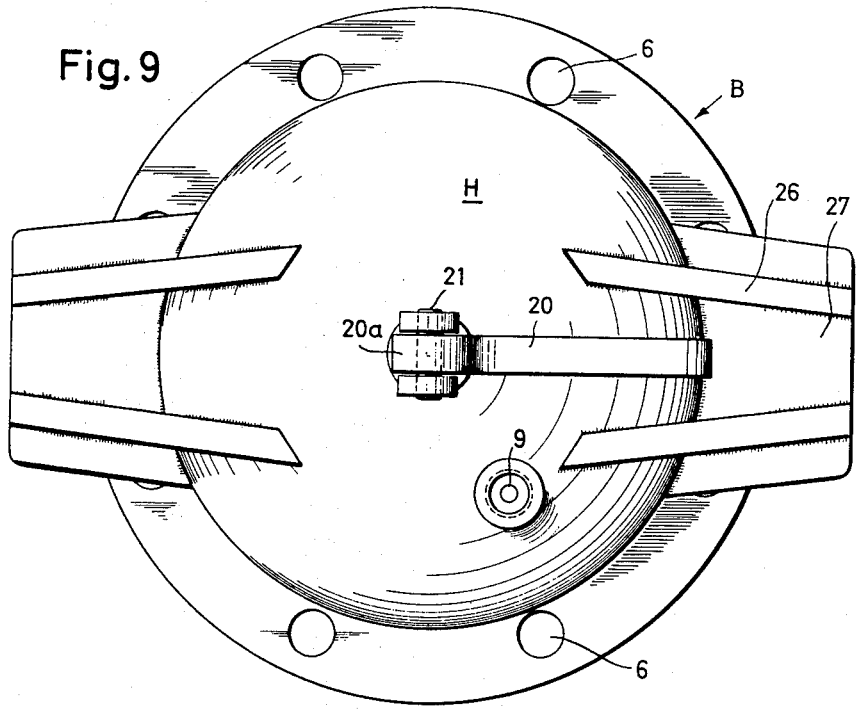
INVENTOR:
ERICH MEINEKE
BY Robert K. Jacob
AGT.

United States Patent Office 3,215,166
Patented Nov. 2, 1965

3,215,166
FLANGED JOINT FOR PIPES
Erich Meinecke, Berkhopen, via Peine, Germany, assignor to Schonebecker Brunnenfilter G.m.b.H., Kleefeld, Germany, a firm
Filed Oct. 5, 1962, Ser. No. 229,282
Claims priority, application Germany, Oct. 9, 1961, Sch 30,396; Apr. 26, 1962, Sch 31,368; July 10, 1962, Sch 31,720
6 Claims. (Cl. 138—90)

This invention relates to flanged joints for pipes, and more particularly to a flanged joint which is provided with equipment for automatically sealing the joint.

This invention also relates to a pressure testing device for pipes and fittings which can be mounted by means of an automatically sealing flange joint. The invention also relates to the attachment of a closure at the end of a flanged pipe which can be performed by means of the said pressure testing device.

In order to obtain a sufficiently tight seal for joining or connecting flanges of pipes, pipe lines, fittings, receptacles and similar equipment subjected to high internal pressures as well as for test flanges used in pressure tests of such equipment, it is necessary to press the seal in question against a counter surface with a pressure that becomes greater as the internal pressure in the pipes increases. The contact pressure of the conventional flanged joints is produced by the connecting screws which pass through boreholes arranged circularly in the mating flanges.

Since the necessary contact pressure frequently depends on the state of the sealing surface of the flanges and on the material the seals are made of, as well as on the anti-fatigue strength of the screws used, it is frequently necessary to tighten the screws of the flanged joints when they show leaks because of increased internal pressure. Such leaks can not be prevented even if the screws of all joints are tightened during assemblage with the same torque. The occurrence of leaks is usually due to the fastening screws being stretched or the seals being deformed. The necessity of subsequently tightening the screws does not only require additional work but involves also the danger of torsional stresses in the screws being retightened that result in breaking of the screw bolts during subsequent use.

The phenomenon that a flanged joint will develop a leak because of increased internal pressure is particularly troublesome in case of test flanges which are used when making pressure tests in pipes, pipe lines, fittings, receptacles and the like prior to their being put to use or at regular intervals during use. In such pressure tests the part to be tested is subjected to pressure of from one and a half up to twice the operating pressure according to its type, size and pressure step, the part to be tested being connected by means of a test flange to the source furnishing the testing medium such as compressed water supplied by a pump. This test flange is provided with corresponding attaching means for the pressure medium line and is mounted on the pipe line, fitting, receptacle or the like. In this case, of course, care must be taken to see that the other openings of the part to be tested are closed.

Owing to the high test pressures which, for instance, in case of flanged boreholes and blow out preventers amount to one and a half or twice the operating pressure, especially great difficulties will be encountered with regard to the leakiness of flanged joints as a result of increasing internal pressure, which hitherto could only be prevented by increasing the test pressure in steps and retightening the clamping bolts of the test flange after each such increase in pressure. This cumbersome mode of operation requires a great expenditure of time and effort which renders the pressure test more difficult and expensive.

Similar problems also occur in assembling closures on high-pressure lines and high-pressure receptacles because it is necesary with such closures for the sake of maintaining a tight seal and reliability of working to make certain that the connecting means consisting of nuts and screws are tightened uniformly and with sufficiently high initial tension so that no leaks will develop during subsequent use. In such a case, too, it is necessary to press the closures in question against the counter surface with a pressure which is much greater than the subsequent operating pressure will be. Especially with closures of larger dimension subjected to high pressures the forces required for tightening the screws are of such magnitude that it is impossible to attain reliable uniform initial tensioning of the screws even when torsion wrenches are used. In addition, uniform tightening of the screws requires a large expenditure of time and effort, because during tightening the screw bolts are subjected simultaneously to tensile and torsional stresses which sometimes will result in breaking.

It is an object of the present invention to provide a flanged joint for pipes, fittings, receptacles and the like which includes means or an assembly for automatically sealing the joint.

It is a further object of this invention to form a flanged joint for pipes in such a manner that the pressure acting upon the seal is proportional to the internal pressure acting upon the flanged joint.

It is still a further object of this invention to provide a flanged joint on pipes which is easy to attend and operates reliably.

It is still another object of this invention to provide a flanged joint which for use with conventional flanged pipes requires a structural modification at one end only.

Yet another object of this invention is to provide a flanged joint of the above type the assembly of which, apart from the connecting screws, does not require the assembling of loose parts.

A further object of this invention is the introduction of a pressure test apparatus for pipes and fittings, which by means of an automatically sealing joint may be attached to the flange of a pipe, fitting, or the like.

It is still a further object of this invention to provide a pressure test assembly for pipes and fittings the mounting of which requires neither screws nor nuts.

Yet a further object of this invention is to provide for mounting a closure at the end of a flanged pipe, by means of which the closure may be pressed against a pipe end flange by a pressure-generating device, which may be in conformity with the above-mentioned pressure test equipment, in such a way that the nuts on the clamping bolts may be tightened without any special auxiliary means and that with the closure covers installed the clamping bolts are subjected to substantially the same tensile stresses.

Preferred embodiments of the invention will now be described by way of example and with reference to the accompanying drawings, in which:

FIG. 1 is a vertical section through a flanged joint according to the invention;

FIG. 2 is a perspective view of an annular piston in accordance with the invention including a pressure ring;

FIG. 8 is still another embodiment of a test flange, and

FIG. 9 is a top plan view of the device shown in FIG. 8.

Like reference numerals indicate like structural elements in the several figures of the drawings.

Figure 3:
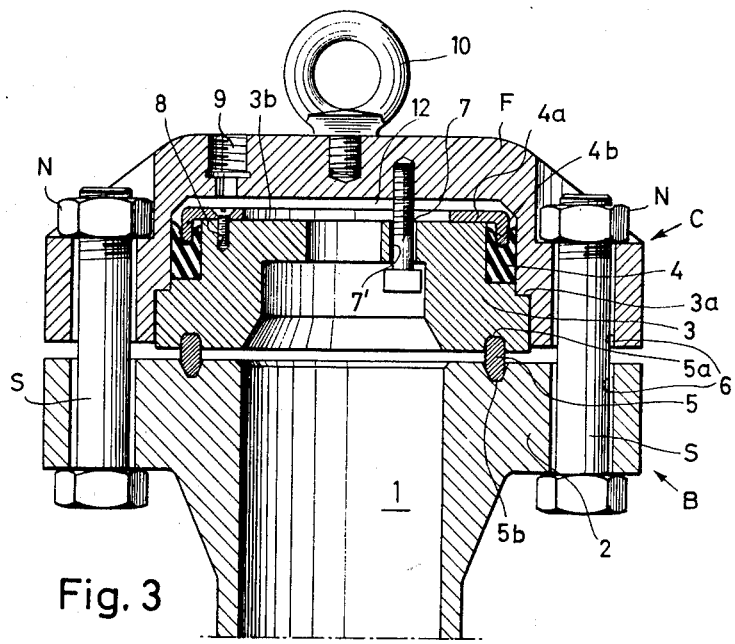
FIG. 3 is a vertical section through a test flange according to the invention.

The flanged joint shown in FIG. 1 consists of a flanged casing A and a flange B which are fastened, for instance by welding, to the ends of pipes 1. The flange B is designed in the usual manner and provided on its end face with an annular groove 5b for the inserting of a seal 5 for sealing the joint. For fastening of the flanged casing A and flange B together boreholes 6 are distributed over the circumference of both flanges, through which clamping bolts S are passed and onto the threaded parts of which corresponding nuts N are screwed.

To generate a contact pressure upon seal 5 that depends on the internal pressure, the flange of casing A is provided with an annular piston P which is axially movable in an expanded cylindrical borehole 2 in the casing A.

The circumference of the annular piston P is sealed by means of an annular seal 4 which, for instance, may be an annular seal in a groove.

The annular piston P bears against the seal 5 on the side directed towards the flange B while an annular groove 5a corresponding to the cross section of the seal 5 is provided on the annular piston P. The internal diameter of the seal 5 is smaller than the external diameter of the seal 4 so that the annular piston P on the side Pc directed towards the flange B has a smaller effective piston surface than at the opposite end face Pb.

To have the end face Pb of the annular piston P always acted upon by the internal pressure prevailing in the pipe 1 and the borehole 2 the annular piston P and the borehole 2 are shouldered at Pa so that as the shoulder rests against the correspondingly shouldered cylindrical inner wall of the borehole 2 there remains a free annular space 12 between the end face Pb of the annular piston P and the opposite end face of the cylindrical borehole 2. By this measure after the contact has been established the annular piston P is pressed at once by the pressure prevailing within the pipe line against the seal 5 which thus provides a tight seal of the joint.

The annular piston P is preferably movable in the borehole 2 in a limited manner in axial direction and cannot be turned. For this purpose two or more screws 7 are provided which pass through correspondingly shouldered boreholes 7a in the annular piston P and are screwed into threaded holes in the end face of the borehole 2. Between the head of the screw 7 and the shoulder in the borehole 7a in the annular piston P there is provided a clearance conforming to the stroke of the piston P. The screws 7 ensure that the annular piston P does not drop out of the flanged casing A on severing the connection. At the same time they permit the piston P to be exchanged, if required, or to be removed for renewal of the seal 4.

The operation of the flanged joint according to the invention is as follows:

The flange of casing A is connected with the counter flange B in the usual manner, the connecting means S and N used for this purpose requiring only moderate tightening. Now, when the interior space of the pipe line is subjected to pressure the annular piston P presses the seal 5 against the counter surface on the flange B because the effective piston surface on the piston P is greater on the end face Pb remote from the seal 5 than on the side Pc facing the seal 5. The seal, therefore, is pressed on with a pressure depending on the actually prevailing internal pressure, in a manner that the necessary contact pressure can be determined in a simple manner by suitably proportioning the effective areas of the top and bottom surfaces of the pistons. The clamping bolts S on the flanges merely need to absorb the reaction force of the annular piston pressing against the seal 5, while the connection between the flange of casing A and flange B remains tight even in case of high pressures because the pressure against the seal 5, which is the result of the difference between the pressure acting upon the piston end face Pb and the piston bottom Pc, constantly remains at the same proportion relative to the internal pressure.

FIG. 2 shows an annular piston P such as used in the assembly shown in FIG. 3 in exploded view. This piston P is the same as piston 3 shown in FIG. 3 where the ring 4a is also shown. The center borehole of the annular piston corresponds in case of pipe joints substantially to the pipe cross sections. The top of the annular piston P has four boreholes 7a equally distributed along its circumference, through which the screws 7 are passed when the piston P is fastened in the enlarged borehole 2 of a pipe end. The seal 4 which, resting on a shoulder of the piston, surrounds the top part of the piston which is smaller in diameter than the maximum diameter of the piston, can be replaced after removal of the screws 7 and of the pressure ring 4a which can be removed after loosening of the countersunk screws 8 (see FIG. 3). It should be noted that the downwardly bent rim 4b of the pressure ring 4a engages in an annular groove located on top of the seal 4 and thus has no contact with the cylindrical wall guiding the piston P.

The principle in accordance with this invention can also be utilized in flanged casings for testing internal pressures. FIG. 3 shows a first embodiment of such a flanged casing which is designated by C and forms a cylindrical casing that is open on one side, having a cover F which is parallel to the end face 3b of the piston. The flange of casing C is fastened in the customary manner by the bolts S located in the circumferentially disposed boreholes 6 and by nuts N to the part to be tested the flange of which is designated by B. The annular piston 3 which presses the seal 5, disposed between the flanged casing C and the flange B, against the part to be tested is of the same design as that described in connection with the previously described embodiment, with the exception that it is not necessary in this case to have the central opening of the piston 3 of the same dimensions as the free cross section of the pipe 1. For this reason the stroke-limiting screws 7 may be guided through openings 7' which are arranged in a shoulder surrounding the central opening of the piston 3.

The cover F on top of the flanged casing C is provided with an inlet 9 for connection to a supply line for the test medium. This inlet 9 is disposed at the side of the central opening of the annular piston 3 so that the entire pressure of the test medium acts at once upon the end face 3b of the piston 3 at the beginning of the test and presses this piston 3 downwardly against the seal 5. For better handling of the casing during assembly and disassembly its top may be provided with an eyebolt 10.

Figure 4:
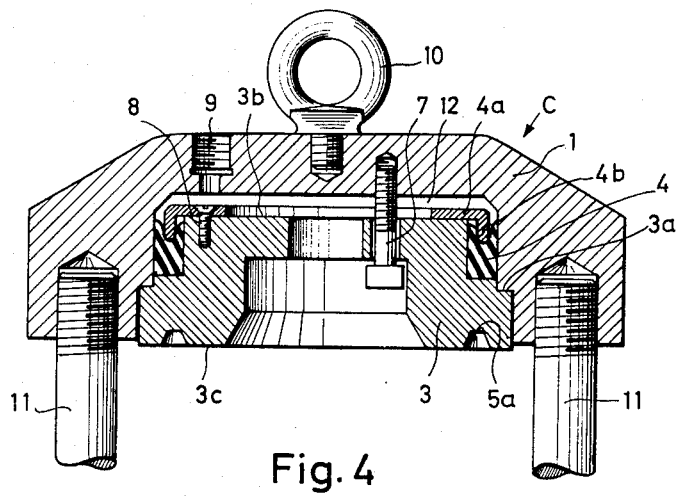
FIG. 4 is a modified embodiment of the test flange shown in FIG. 3.

The flanged casing of FIG. 4, which is shown separated from the counter flange B, corresponds to the embodiment shown in FIG. 3, except that stud bolts 11 are used for mounting it.

The mode of operation of the flanged test casings shown in FIGS. 3 and 4 with respect to contact pressure upon the seal 5 corresponds to the embodiment shown in FIG. 1.

Figure 5:
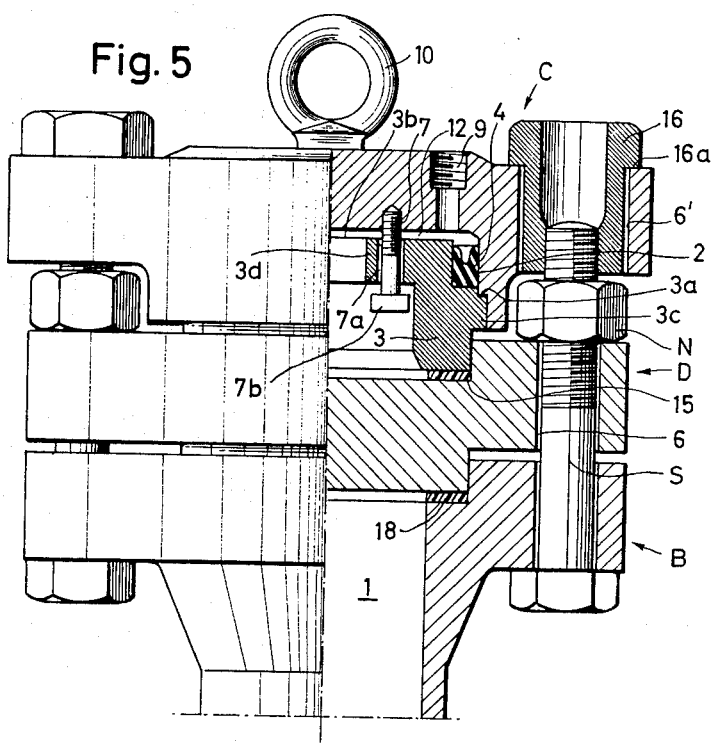
FIG. 5 shows a closure for a pipe or receptacle, partially in section, during mounting of the cover by means of a pressure-generating device of the type shown in FIG. 3.

FIG. 5 shows the use of a device of the type shown in FIG. 3 in fastening a cover to a high-pressure line or high-pressure tank. This device differs from that described previously substantially in that holes 6' arranged in the flange of the casing C, which register with the holes 6 in the flange B on the pipe 1 and with those in the flange of the cover D, have a larger diameter, enabling them to accommodate hollow nuts 16 which fit the ends of the clamping bolts S and are supported by a shoulder 16a on the top of the casing C. Another difference with respect to FIG. 3 is that the seal 5 is replaced by a flat gasket 15 disposed between the annular piston 3 and the top of the cover D. Although FIG. 5 shows no annular groove 5a at the bottom of the annular piston 3, it is evident, of course, that a seal may be used that is flat at the bottom.

The flanged casing C according to FIG. 5 consists of a cylindrical casing open at one end with a piston 3 guided therein. The piston is designed as an annular piston and sealed against the inner wall of the cylindrical borehole 2 by the annular seal 4. The inlet 9 passes through the closed top of the casing and is adapted to be connected to a conduit leading to a source of pressure medium.

Circumferentially of the casing C the hollow nuts 16 for the boreholes 16a are disposed corresponding in number and arrangement to the clamping bolts S. The hollow nuts 16 fit the threads of the clamping bolts S. The nuts N holding the cover D during operation are generally threaded by hand onto the clamping bolts S without any particular initial tension prior to attaching the test casing C. The hollow nuts 16 are arranged on the flanged casing C in such a manner that there is some clearance between its bottom and the top of the nuts N when the end face of the piston 3 engages the opposite end face of the cover D and the piston has not yet been acted upon by the pressure medium. Compared with the device shown in FIG. 3 it can be seen that the flange of the test casing C shown in FIG. 5 has been cut out in the region where the nuts N are located.

The gasket 15 serves as a pressure cushion intended to compensate for unevennesses on the top of the cover D. Similar to the preceding embodiment, piston 3 has a projection at 3c extending outwardly which engages a suitably expanded part of the casing. Owing to the contact of this projection 3c with the upper end 3a of the enlargement the movability of the piston 3 is limited toward the top so that there remains the free space 12 between the end face 3b of the piston and the wall closing the casing at the top. Thus, the pressure of the pressure medium admitted through the inlet 9 can be distributed evenly over the entire top of the piston so that the latter will not tend to jam and can, therefore, be of short dimension in axial direction.

The axial movability of the piston 3 toward the open side of the casing is limited by one or several of the screws 7, but preferably by at least two screws, so that there will remain a certain clearance between the head or heads 7b and the bottom of the piston in a centrally retracted part 3d. This clearance is such that the projection 3c, even at the lowermost position of the piston 3 which it may assume, for example, while not in use, will not be disengaged from the cylindrical borehole 2. The shafts of the screws 7 pass through the corresponding boreholes 7a in the centrally retracted part 3d. For better handling of the flanged test casing C the top of said casing may be provided with the eyebolt 10.

In mounting the cover D this cover is first placed on the flange B of the pipe 1. Then the nuts N are tightened, without great effort and preferably by hand, until their bottoms engage the top of the cover D.

Now the flanged test casing C is mounted on the extended and upwardly projecting ends of the bolts S by screwing on the hollow nuts 16. Here too, it suffices to lightly tighten by hand the hollow nuts 16. Now the top of the piston is subjected to pressure by the admission of pressure media through the inlet 9 into the space 12, the reaction force of which produces a tensile stress in the bolts S.

Figure 6:
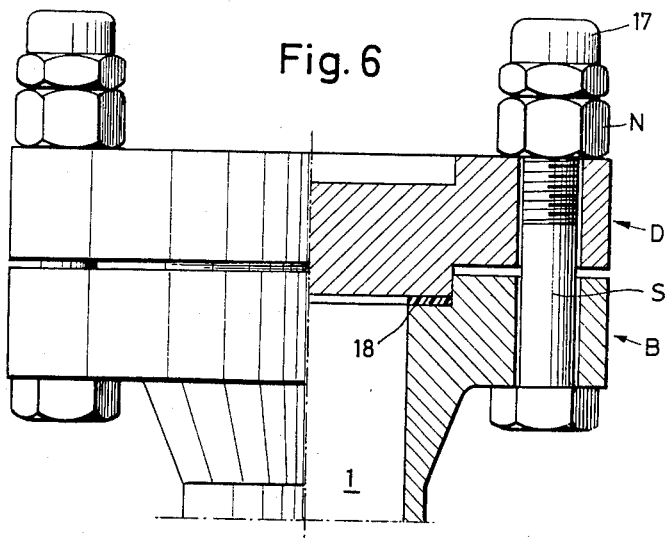
FIG. 6 is a closure shown in FIG. 5 after having been mounted.

As soon as the necessary contact pressure has been attained, which corresponds to the calculated tensile stress of the bolts S and can be controlled, for instance, by means of a pressure gauge, the nuts N are tightened on the bolts S, which now are strained in longitudinal direction, until the nuts reengage the end face of the cover D. This, too, does not require any great effort. Since the pressure exerted by the piston 3 on the cover D is distributed absolutely uniformly, tensile stress of the same magnitude will be generated in all bolts S. On screwing down the nuts N until they engage the top of the cover D said tensile stress will be maintained in every bolt S. This pressure will also be maintained when subsequently the pressure of the medium is released from the piston 3 and the flanged test casing C is separated from the cover D by loosening the hollow nuts 16. The upwardly projecting ends of the bolts S may subsequently be protected by cap nuts 17 against damage and corrosion. The cover is shown in its mounted position in FIG. 6.

The above-described assembly may also be used in the same manner for loosening closures on high-pressure lines or high-pressure tanks. In such case, the process is reversed, the bolts S are first strained, with the nuts N still tight, and these latter can then be loosened without great effort.

Figure 7:
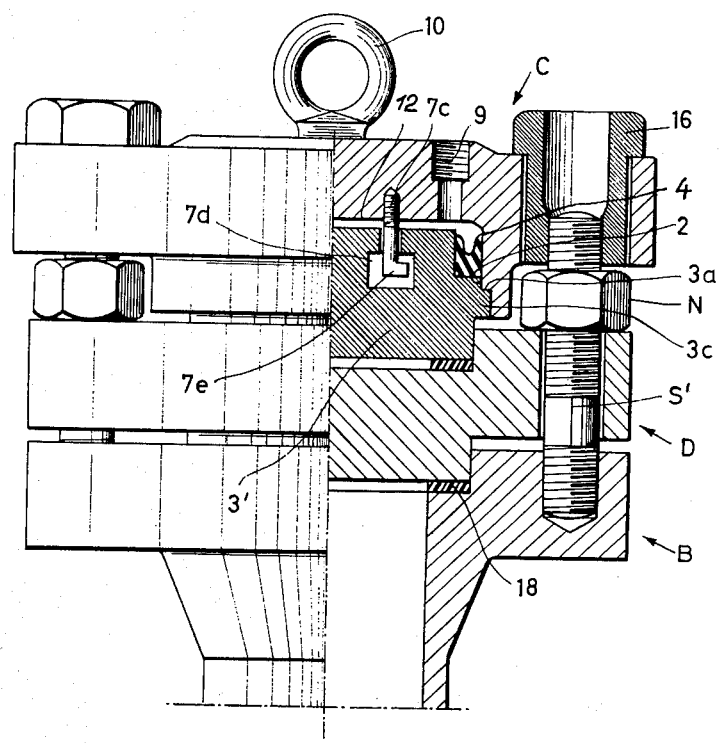
FIG. 7 is another embodiment of the device shown in FIG. 5.

The flanged test casing C shown in FIG. 7 differs from that shown in FIG. 5 merely in that a disk piston 3' is used instead of the annular piston 3, the axial movements of which are limited in both directions. While in FIG. 5 during the movement into the borehole 2 the abutment on the annular surface 3a becomes effective the stroke of the piston 3' is limited toward the outside by one or preferably several screws 7c each provided with a unilaterally projecting hammer head 7e, which engage in openings 7d in the top of the piston 3'. The openings 7d, having an enlarged bottom and an upper part similar to a keyhole, allow the insertion of the screws 7c with their heads 7e only in a certain position. After having assembled the piston 3' the said piston is brought into engagement with the hammer headed screws 7e and then somewhat turned around its axis such that the piston is held within the bore 2. Thus the necessary restricted axial movement of the piston 3' is maintained since the enlarged inner portion of the openings 7d is so long in the axial direction that the piston 3' can move in the desired manner but is not able to come out of engagement with the inside wall of bore 2. In order to avoid a rotational movement of the piston 3' a pin or a set screw (not shown) may be inserted into a corresponding transversal bore in the downwardly projecting wall defining the enlarged lower portion of the bore 2. The inside end of said pin or setscrew engages a recess at the circumference of portion 3c of the piston which recess is parallel to the axis of the arrangement. Said recess does not influence the impermeability of the chamber 12 above the piston due to arrangement of the seal 4.

The particular advantage of the assembly shown in FIG. 5, i.e. when using the annular piston 3, consists in that by means of the same equipment pressure tests can also be performed on pipes, fittings, receptacles and the like.

A pressure testing assembly operating substantially in the same way as the device 3a is shown in FIGS. 8 and 9. This latter device is characterized in that it can be more rapidly and conveniently attached to and removed from the counter flange of an apparatus to be subjected to a test pressure. For this purpose the pressure testing device has been designed so that it may be pushed laterally onto the counter flange so that it engages over the latter with stationary claws provided at its outer circumference which subsequently firmly bear against the counter flange when the device is subjected to pressure by a pressure medium. To prevent the annular piston movable in the casing from being damaged when the device is pushed on laterally, means are provided which allow said annular piston to be retracted as far as behind the rim of the casing and to be fixed there. At the same time there are provided flexible means which displace the annular piston, when the locking mechanism is released, in the direction toward said counter flange, and thus take care that at the side of the piston remote from the sealing surface a corresponding pressure will be developed during testing. The springs displacing said piston into the operating position need only exert a slight force in order to bring said annular piston after release of the locking mechanism into engagement with the sealing surface with a light pressure.

The test casing generally designated by C'' is an open round casing H open on one side, the wall of which, starting with a cylindrical peripheral part H', is curved towards the central portion.

In order to generate a contact pressure which depends on the internal pressure, upon a seal 5c, which is mounted between the sealing surfaces between the casing H and the flange B, there is provided an annular piston 3'' guided in the casing H, which is sealed relative to the cylindrical interior part H' of the casing H by means of an annular grooved seal 4 conforming to the previous embodiments. The effective diameter of the annular piston 3'' is larger at the side remote from the seal 5c than at the first mentioned side so that said annular piston due to the effect of the pressure medium which is admitted through the inlet 9 during the pressure test, is firmly pressed against the seal 5c because of the differential pressure.

The annular piston 3'' is movable in a limited way in axial direction in its casing H and can assume a front position as shown in FIG. 8, where it engages with a shouldered rim h in the interior of the counter flange B. The piston 3'' can also be brought into a retracted position in which its end face is disposed behind the plane formed by the lower rim of the casing H.

This movability of the annular piston in axial direction serves to permit the test casing to be laterally pushed on and withdrawn from the counter flange when the annular piston is retracted so that no screw bolts are necessary for mounting the test casing. Instead of such holding means which are troublesome to fasten and to remove, the outer circumference of the device C'' has been equipped with two diametrically opposed hooks or claws 27 which engage below the flange B on the pipe 1 and are welded to the casing H and are stiffened at their upper sides by ribs 26.

The hooks 27 on the test casing require no changes on the counter flange B which, therefore, may be provided in the customary manner with boreholes 6 for the insertion of clamping bolts, for instance, for connection to another pipe or for attachment of a cover.

The annular piston is limited in its axial movability in the casing H by screws 7 which are fastened in suitable screw bases 7f at the inside of the wall of the casing H and the heads of which engage in sleeves 28 which in turn are mounted on the bottom 24 of the annular piston 3'', provided with openings 23. The sleeve 28 is also equipped with a spring 19 which is supported on the base 7f and tends to urge said annular piston into its advanced position.

In order to retract the piston against the action of the spring 19 into the casing H and fix it there the central part of the bottom 24 of the annular piston is provided with a pull rod 22 and fastened, for example, by means of a split pin 25, and is brought out at the top through a pressure-tight arrangement at E and is connected to a hand lever 20 by way of an eccentric 20a, which is pivotally connected to the pull rod by a bolt 21. When this hand lever 20 is moved counterclockwise from its position shown in FIG. 8, the annular piston 3'' enters its retracted position. This position will be maintained because the lever 20 with the eccentric 20a is past the dead-center position after having been moved to the left.

Of course, it is advantageous to provide two or more screws 7 and springs 19 with their respective holders, which are distributed uniformly over the circumference of the annular piston.

The embodiments described above can be used both for very large and very small pipe diameters and can also be used for very high pressures. The type and the material of the seals actually used are selected in conformity with the size of the equipment and the pressure in question.

The invention may be embodied in other specific forms without departing from the spirit or essential concepts thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A pressure testing assembly comprising a flanged casing having at least a partially cylindrical interior and having a flange, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange and a sealing ring between said piston and said casing.

2. A pressure testing assembly comprising a flanged casing having at least a partially cylindrical interior and having a flange, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange and a sealing ring between said piston and said casing, and being axially movable in said casing and sealed by said sealing ring against the wall of said casing and having a surface adjacent said inlet of greater area than the surface area of said piston proximte said end flange whereby upon application of internal pressure said piston tends to move outwardly from said bore and applies a force against said annular seal member which is proportional to the internal pressure.

3. A pressure testing assembly comprising a flanged casing having at least a partially cylindrical interior and having a flange, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange, and being axially movable in said casing and sealed against the wall of said casing and having a surface adjacent said inlet of greater area than the surface area of said piston proximate said end flange whereby upon application of internal pressure said piston tends to move outwardly from said bore and applies a force against said annular seal member which is proportional to the internal pressure, said casing having a bore with portions thereof of different diameters defining a step therebetween and said piston presenting a circumferential shoulder for engaging said step.

4. A pressure testing assembly comprising a flanged casing having at least a partially cylindrical interior and having a flange, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange, and being axially movable in said casing and sealed against the wall of said casing and having a surface adjacent said inlet of greater area than the surface area of said piston proximate said end flange whereby upon application of internal pressure said piston tends to move outwardly from said bore and applies a force against said annular seal member which is proportional to the internal pressure, said casing having a bore with portions thereof of different diameters defining a step therebetween and said piston presenting a circumferential shoulder for engaging said step, and means for limiting the axial movement of said piston in said bore comprising a plurality of bores in said piston and screws extending through said bores into said casing, said shoulder and step limiting axial movement in one direction and said screws and holes limiting the axial movement in the opposite direction.

5. A pressure testing assembly comprising a flanged casing having at least a partially cylindrical interior and having a flange, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange, and being axially movable in said casing and sealed against the wall of said casing and having a surface adjacent said inlet of greater area than the surface area of said piston proximate said end flange whereby upon application of internal pressure said piston tends to move outwardly from said bore and applies a force against said annular seal member which is proportional to the internal pressure, said casing having a bore defining said partially cylindrical interior and said piston having portions thereof of different diameters defining a circumferential shoulder said sealing means including a circumferential seal disposed on said shoulder and engaging said flange, and a locking device comprising a pull rod guided in a fluid-tight manner through said casing, said pull rod engaging at the inner end of said piston substantially at its center and being connected at the other end to an eccentric lever pivotable outwardly of said casing.

6. A pressure testing assembly comprising a flanged casing having at least a partially cylindrical interior and having a flange provided with claws, said flange being mounted on the end flange of a pipe to form a joint, said assembly having an inlet for a pressure medium and including sealing means comprising a single unitary rigid piston operative upon the admission of pressure medium through said inlet to tightly seal said joint, said sealing means also comprising an annular seal member between said piston and said end flange, and being axially movable in said casing and sealed against the wall of said casing and having a surface adjacent said inlet of greater area than the surface area of said piston proximate said end flange whereby upon application of internal pressure said piston tends to move outwardly from said bore and applies a force against said seal member which is proportional to the internal pressure, said casing having a bore defining said partially cylindrical interior and said piston having portions thereof of different diameters defining a circumferential shoulder, said sealing means including a circumferential seal member disposed on said shoulder and engaging said flange, and a locking device comprising a pull rod guided in a fluid-tight manner through said casing, said pull rod engaging at the inner end of said piston substantially at its center and being connected at the other end to an eccentric lever pivotable outwardly of said casing, said claws being effective to engage said flange from the side when said pull rod is drawn in by said eccentric lever.

References Cited by the Examiner
UNITED STATES PATENTS

| | | | |
|---|---|---|---|
| 2,365,001 | 12/44 | Powers | 138—90 |
| 2,543,311 | 2/51 | Augspurgen | 285—101 |
| 2,604,225 | 7/52 | Armstrong | 220—40 X |
| 2,675,939 | 4/54 | Fraser | 220—40 |
| 2,712,458 | 7/55 | Lipson | 285—101 |
| 2,873,764 | 2/59 | Lombard | 138—90 |
| 3,062,401 | 11/62 | Needham | 220—46 |

LAVERNE D. GEIGER, *Primary Examiner*.

CARL W. TOMLIN, LEWIS J. LENNY, EDWARD V. BENHAM, *Examiners*.